United States Patent [19]

Dharmarajan et al.

[11] Patent Number: 6,013,727
[45] Date of Patent: Jan. 11, 2000

[54] THERMOPLASTIC BLEND CONTAINING ENGINEERING RESIN

[75] Inventors: Narayanaswami Raja Dharmarajan, Highland Park; Robert Chester Puydak, Cranbury; Hsien Chang Wang, Edison; Kenneth William Powers, Berkeley Heights; Thomas Chen-Chi Yu; Donald Ross Hazelton, both of Chatham, all of N.J.

[73] Assignee: Exxon Chemical Patents, Inc., Baytown, Tex.

[21] Appl. No.: 07/648,267

[22] Filed: Jan. 31, 1991

Related U.S. Application Data

[63] Continuation-in-part of application No. 07/563,464, Aug. 7, 1990, abandoned, which is a continuation-in-part of application No. 07/558,698, Jul. 26, 1990, Pat. No. 5,013,793, and application No. 07/442,028, Nov. 27, 1989, Pat. No. 5,162,445, which is a continuation-in-part of application No. 07/441,575, Nov. 22, 1989, abandoned, which is a continuation-in-part of application No. 07/416,503, Oct. 3, 1989, abandoned, application No. 07/416,713, Oct. 3, 1989, abandoned, and application No. 07/199,665, May 27, 1988, abandoned, said application No. 07/416,503, and application No. 07/416,713, each is a continuation-in-part of application No. 07/199,665.

[51] Int. Cl.[7] .......................... C08L 77/00; C08L 51/04; C08L 69/00; C08L 81/00
[52] U.S. Cl. .......................... 525/72; 525/76; 525/133; 525/146; 525/151; 525/153; 525/155; 525/165; 525/166; 525/175; 525/178; 525/179; 525/180; 525/184; 525/186; 525/189; 525/207; 525/209; 525/213
[58] Field of Search ............................ 525/184, 178, 525/333.4, 72, 76, 146, 165, 166, 175, 179, 189, 155, 186, 133, 151, 209, 213, 207, 180, 153

[56] References Cited

U.S. PATENT DOCUMENTS

| | | | |
|---|---|---|---|
| 2,516,741 | 7/1950 | Young et al. | 525/184 |
| 3,037,954 | 6/1962 | Gessler et al. | 260/29.8 |
| 4,130,534 | 12/1978 | Coran et al. | 260/33.6 |
| 4,143,221 | 3/1979 | Naarmann et al. | 525/333.4 |
| 4,172,859 | 10/1979 | Epstein | 428/402 |
| 4,173,556 | 11/1979 | Coran et al. | 260/30.8 R |
| 4,174,358 | 11/1979 | Epstein | 525/183 |
| 4,197,379 | 4/1980 | Coran et al. | 525/142 |
| 4,207,404 | 6/1980 | Coran et al. | 525/184 |
| 4,226,953 | 10/1980 | Coran et al. | 525/193 |
| 4,287,324 | 9/1981 | Coran et al. | 525/408 |
| 4,297,453 | 10/1981 | Coran et al. | 525/408 |
| 4,338,413 | 7/1982 | Coran et al. | 525/179 |
| 4,348,502 | 9/1982 | Coran et al. | 525/183 |
| 4,350,794 | 9/1982 | Moncur | 525/183 |
| 5,013,793 | 5/1991 | Wang et al. | |
| 5,063,268 | 11/1991 | Young | 524/286 |
| 5,162,445 | 11/1992 | Powers et al. | |

OTHER PUBLICATIONS

Doran, A., Thermoplastic Elastomers: A Comprehensive Review, Ch. 7 (1987).

*Primary Examiner*—Ana Woodward
*Attorney, Agent, or Firm*—Myran B. Kurtzman; Brent M. Peebles; Joseph F Reidy

[57] ABSTRACT

A thermoplastic composition which may be unvulcanized or vulcanized is provided which comprises a polymer blend of an elastomeric thermoplastic engineering resin and a halogen-containing copolymer of a $C_4$ to $C_7$ isomonoolefin and a para-alkylstyrene. A process for preparing a dynamically vulcanized composition is also provided.

28 Claims, No Drawings

THERMOPLASTIC BLEND CONTAINING ENGINEERING RESIN

CROSS REFERENCE TO RELATED APPLICATIONS

This application is a continuation-in-part of application Ser. No. 563,464, filed Aug. 7, 1990, abandoned, which is a continuation-in-part of application Ser. No. 442,028, filed Nov. 27, 1989, now U.S. Pat. No. 5,162,445, and also a continuation-in-part of application Ser. No. 558,698, filed Jul. 26, 1990, now U.S. Pat. No. 5,013,793. Said application Ser. No. 442,028 is a continuation-in-part of application Ser. No. 441,575, filed Nov. 22, 1989, abandoned, which is a continuation-in-part of application Ser. No. 416,503, filed Oct. 3, 1989, abandoned, application Ser. No. 416,713, filed Oct. 3, 1989, abandoned, and application Ser. No. 199,665, filed May 27, 1988, abandoned. Said application Ser. No. 416,503 and application Ser. No. 416,713 are each a continuation-in-part of said application Ser. No. 199,665.

BACKGROUND OF THE INVENTION

1. Field of the Invention

The invention relates to thermoplastic compositions having improved properties and a process for preparing the compositions. Optionally, these blends may be dynamically vulcanized.

2. Description of Information Disclosures

In recent years, there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessability of thermoplastic resins. The elastomeric characteristics may be enhanced if one component of the blend is a vulcanizable elastomer which is wholly or partially crosslinked.

U.S. Pat. No. 4,130,534 discloses elastoplastic compositions comprising a blend of a thermoplastic crystalline polyolefin resin and a rubber which may be butyl rubber, chlorobutyl rubber or bromobutyl rubber.

U.S. Pat. No. 4,172,859 discloses a thermoplastic composition containing a polyamide matrix resin and at least one polymer having a specified tensile modulus.

U.S. Pat. No. 4,174,358 discloses a thermoplastic composition containing a polyamide matrix resin and at least one polymer having a specified tensile modulus.

The earliest work in the curing of TPO compositions was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler's U.S. Pat. No. 3,037,954 discloses compositions comprising polypropylene and a rubber wherein the rubber may be, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. No. 4,639,487 discloses a heat shrinkable thermoplastic composition of an ethylene copolymer resin with a dynamically vulcanized halogenated butyl rubber.

Dynamically vulcanized thermoplastic compositions comprising a polyamide and various types of elastomers are known. See, for example, U.S. Pat, No. 4,173,556; U.S. Pat. No. 4,197,379; U.S. Pat. No. 4,207,404; U.S. Pat. No. 4,297,453; U.S. Pat. No. 4,338,413; U.S. Pat. No. 4,348,502; and U.S. Pat. No. 4,419,499.

U.S. Pat. No. 4,287,324 discloses a dynamically vulcanized composition comprising a blend of a crystalline polyester and a cured epichlorohydrin.

U.S. Pat. No. 4,226,953 discloses a dynamically vulcanized composition comprising a blend of styrene-acrylonitrile resin and a nitrile rubber.

U.S. Pat. No. 4,350,794 discloses a polyamide molding and extrusion composition prepared by melt blending a polyamide resin and a polyamide reactive halogen functional elastomer.

There is still a need to improve the properties of uncured and of dynamically vulcanized alloys.

It has now been found that compositions comprising a thermoplastic engineering resin and a halogen-containing copolymer of an isoolefin and a para-alkylstyrene have improved properties, such as higher Vicat softening temperature, lower oil absorption, resistance to compression set, and retention of properties after heat aging. Moreover, these compositions may be stabilized to ultraviolet light exposure without adversely affecting their properties. The compositions may also comprise uncured or dynamically cured elastomers.

SUMMARY OF THE INVENTION

In accordance with one embodiment of the invention, there is provided a thermoplastic composition comprising a polymer blend of a thermoplastic engineering resin, and an elastomeric halogen-containing copolymer of a $C_4$ to $C_7$ isomonoolefin and a para-alkylstyrene.

In accordance with an other embodiment of the invention, there is provided a thermoplastic composition comprising a vulcanized polymer blend of a thermoplastic engineering resin, and an elastomeric halogen-containing copolymer of a $C_4$ to $C_7$ isomonoolefin and a para-alkylstyrene.

DETAILED DESCRIPTION OF THE INVENTION

The thermoplastic composition of the present invention comprises a blend of a thermoplastic engineering resin, and an elastomeric halogen-containing copolymer of a $C_4$ to $C_7$ isomonoolefin and a para-alkylstyrene which may be an unvulcanized composition or which may be statically vulcanized or which may have been subjected to dynamic vulcanization.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

In the embodiment of the invention in which it is desired to obtain dynamically vulcanized alloys (DVA's) the alloys are generally prepared by blending together at least one engineering resin and at least one elastomer with curatives and fillers under conditions of dynamic vulcanization.

In preparing the preferred dynamically vulcanized composition of the present invention, at least a portion of one thermoplastic engineering resin is blended with the elastomeric halogen-containing copolymer.

The thermoplastic engineering resins suitable for practice of the present invention may be used singly or in combination and are resins containing nitrogen, oxygen, halogen, sulfur or other groups capable of interacting with an aromatic haloalkyl group. Suitable engineering resins include resins selected from the group consisting of polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK) and mixtures thereof. Preferred thermoplastic engineering resins are polyamides. The more preferred polyamides are nylon 6 and nylon 11.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6), polyhexamethyleneazelamide (nylon-6,9), polyhexamethylenesebacamide (nylon-6,10), polyhexamethyleneisophthalamide (nylon-6,IP) and the condensation product of 11-amino-undecanoic acid (nylon-11). Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392–414. Commercially available thermoplastic polyamides may be advantageously used in the practice of this invention, with linear crystalline polyamides having a softening point or melting point between 1600°–230° C. being preferred.

Suitable thermoplastic polyesters comprise linear, crystalline, high molecular weight solid polymers having recurring

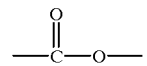

groups including

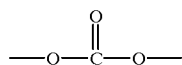

groups within the polymer chain. The term "linear" as used herein in respect to polyester means a polymer in which the recurring ester groups are within the polymer backbone and not pendant therefrom. Linear crystalline polyesters having a softening point above about 50° C. are satisfactory, with polyesters having a softening point or melting point above 100° C. being preferred, with polyesters having a softening point or melting point between 160°–260° C. being more preferred. Saturated linear polyesters (free of olefinic unsaturation) are preferred, however, unsaturated polyesters may be used provided that the rubber, if cross-linked, is cross-linked prior to blending with the polyester or provided that the rubber is dynamically cross-linked with a cross-linking agent that will not significantly induce cross-link formation in the polyester. Cross-linked polyesters are unsatisfactory for the practice of this invention. If significant cross-link formation of the polyester is permitted to occur, the resulting composition is not thermoplastic. Many commercially available thermoplastic linear crystalline polyesters may be advantageously employed in the practice of the invention or they may be prepared by polymerization of one or more dicarboxylic acids, anhydrides or esters and one or more diol. Examples of satisfactory polyesters include poly (trans-1,4-cyclohexylene $C_{2-6}$ alkane dicarboxylates such as poly(trans-1,4-cyclohexylene succinate) and poly(trans-1,4-cyclohexylene adipate), poly(cis or trans-1,4-cyclohexanedimethylene) $C_{0-2}$ alkanedicarboxylates such as poly(cis 1,4-cyclohexane-di-methylene)oxalate and poly-(cis 1,4-cyclohexane-di-methylene) succinate, poly($C_{2-4}$ alkylene terephthalates) such as polyethyleneterephthalate and polytetramethylene-terephthalate, poly($C_{2-4}$ alkylene terephthalates) such as polyethyleneterephthalate and polytetramethylene-terephthalate, poly($C_{2-4}$ alkylene isophthalates such as polyethyleneisophthalate and polytetramethylene-isophthalate, poly(p-phenylene $C_{1-3}$ alkanedicarboxylates such as poly(p-phenylene glutarate) and poly(p-phenylene adipate), poly(p-xylene oxalate), poly (oxylene oxalate), poly(p-phenylenedi-$C_{1-5}$ alkylene terephthalates) such as poly(p-phenylenedimethylene terephthalate) and poly(p-phenylene-di-1,4-butylene terephthalate, poly-($C_{2-10}$ alkylene 1,2-ethylenedioxy-4,4-dibenzoates) such as poly(ethylene-1,2-ethylenedioxy-4,4-dibenzoates), poly-(tetramethylene-1,2-ethylenedioxy-4,4-dibenzoate) and poly-(hexamethylene-1,2-ethylene-dioxy-4,4-dibenzoate), poly($C_{3-10}$ alkylene-4,4-dibenzoates) such as poly(pentamethylene-4,4-dibenzoate), poly(hexamethylene-4,4-dibenzoate and poly(decamethylene-4,4-dibenzoate), poly($C_{2-10}$ alkylene-2,6-naphthalene dicarboxylates) such as poly-(ethylene-2,6-naphthalene dicarboxylates) poly (trimethylene-26-naphthalene dicarboxylates) and poly (tetramethylene-2,6-naphthalene dicarboxylates), and poly-($C_{2-10}$ alkylene sulfonyl-4,4-dibenzoates) such as poly (octamethylene sulfonyl-4,4-dibenzoate) and poly (decamethylene sulfonyl-4,4-dibenzoate. Addtional examples of satisfactory linear polyesters are described in Encyclopedia of Polymer Science and Technology, Vol. 11, pages 68–73 and Korshak & Vinogradova Polyesters, Pergamon Press, pages 31–64. The disclosures thereof are hereby incorporated herein by reference. Suitable polycarbonates are also commercially available. For suitable segmented poly(ether-co-phthalates) see page 46, rubber World Blue Book, supra. Polylactones such as polycaprolactone are satisfactory in the practice of the invention. Preferred polyesters of the invention are derived from aromatic dicarboxylic acids such as naphthalenic or phthalic acids. More preferred polyesters are poly(alkylene terephthalates) especially polytetramethylene terephthalate), or mixed polyphthalates derived from two or more glycols, two or more phthalic acids, or two or more glycols and two or more phthalic acids such as poly(alkylene terecoisophthalates).

Optionally, other thermoplastic polymers, such as polyolefin resins may be included in the polymer blend, such as, for example, PP, HDPE, LDPE, LLDPE, EVA, EMA, etc.

THE ELASTOMERIC HALOGEN-CONTAINING COPOLYMER COMPONENT

Suitable halogen-containing copolymers of a $C_4$ to $C_7$ isomonoolefin and a para-alkylstyrene for use as a component of the composition of the present invention comprise at least about 0.5 weight percent of the para-alkylstyrene moiety. For elastomeric copolymers, the para-alkylstyrene moiety may range from about 0.5 weight percent to about 25 weight percent, preferably from about 1 to about 20 weight percent, more preferably from about 2 to about 20 weight percent of the copolymer. The halogen content of the copolymers may range from above zero to about 10 weight percent, preferably from about 0.1 to about 7 weight percent. The halogen may be bromine, chlorine, and mixtures thereof. Preferably, the halogen is bromine. The major portion of the halogen is chemically bound to the para-alkyl group, that is, the halogen-containing copolymer comprises para-haloalkyl groups.

The copolymers of the isomonoolefin and para-alkylstyrene useful to prepare the halogen-containing copolymers suitable as components of the composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}n$) of at least about 25,000, preferably at least about 30,000, more preferably at least about 100,000. The copolymers also, preferably, have a ratio of weight average molecular weight ($\overline{M}w$) to number average molecular weight ($\overline{M}n$), i.e., $\overline{M}w/\overline{M}n$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 weight percent, and preferably within about 7 weight percent, of the average para-alkylstyrene content for the overall composition, and preferably at least about 97 weight percent of the copolymer product has a para-alkylstyrene content within about 10 weight percent and preferably within about 7 weight percent, of the average para-alkylstyrene content for the overall composition. This substantially homogeneous compositional uniformity thus particularly relates to the inter-compositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of an isoolefin such as isobutylene with para-alkylstyrene is close to one, the compositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

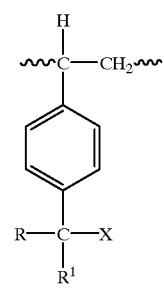

in which R and $R^1$ are independently selected from the group consisting of hydrogen, alkyl preferably having from 1 to 5 carbon atoms, primary haloalkyl, secondary haloalkyl, preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvents prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40 to about minus 95° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression by complexing with the catalyst or copolymerization with the isomonoolefins or the para-alkylstyrene, which in turn will prevent one from efficiently producing the para-alkylstyrene copolymer product useful in the practice of the present invention. Most particularly, these impurities include the catalyst poisoning materials, such as, for example, moisture and the like and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.01 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

It should be noted that radical bromination of the enchained para-methylstyryl moiety in the copolymers useful for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane, heptane or cyclohexane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis-azo compounds, such as azobis isobutyronitrile (AIBN), azobis (2,4-dimethylvalero) nitrile, azobis (2-methylbutyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene can be highly selective under appropriate conditions, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful as a component of the composition of the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis-(2,4-dimethylpentane nitrile), at about 55 to 80° C., for a time period ranging from about 4.5 to about 30 minutes, followed by a caustic quench. The recovered polymer is washed in basic water wash and water/isopropanol washes, recovered, stabilized and dried.

Since little, if any, tertiary benzylic bromine is produced in the molecule (when the halogenation agent is a brominating agent), the potential dehydrohalogenation reaction will be almost entirely eliminated. This results in a halogenated polymer with the improved stability needed for processing at the high temperatures required for melt mixing and processing with engineering resins.

The aromatic haloalkyl group, e.g. the halomethyl group, permits facile crosslinking to be accomplished in a variety of ways, for example, either directly through the halomethyl group or by conversion to other functional groups, to permit the desired crosslinking reations to be employed. Direct crosslinking can be effected with a variety of polyfunctional nucleophilic reagents such as ammonia, amine, polyamines; metal dicarboxylates, metal dithiolates; promoted metal oxides (i.e., ZnO+dithiocarbamates), etc. Crosslinking can also be effected via polyalkylation reactions. The aromatic halomethyl groups thus provide a wide choice of crosslinking reactions to be used that are compatible with the requirements for dynamic vulcanization in a melt mix with the engineering resin component of the present invention.

In the compositions of the present invention, the thermoplastic engineering resin(s) may suitably be present in an amount ranging from about 10 to 98 weight percent, preferably from about 20 to 95 weight percent, the elastomeric halogen-containing copolymer of an isomonoolefin and a para-alkylstyrene may be present in an amount ranging from about 2 to 90 weight percent, preferably from about 5 to 80 weight percent, based on the polymer blend.

The term "polymer blend" is used herein to denote the blend of one or more thermoplastic engineering resins, the elastomeric halogen-containing copolymer and any other polymers (elastomer or non-elastomer) that may be a component of the composition. Optionally, additional elastomers and/or non-elastomeric polymers may be included in the composition of the present invention.

The secant flexural modulus of the thermoplastic compositions may range from about 100 kg/cm² to about 400,000 kg/cm², preferably from about 200 kg/cm² to about 100,000 kg/cm² measured according to ASTM D790 at 1% strain.

A preferred thermoplastic composition of the invention comprises a polyamide such as nylon.

The polymer blend may comprise about 25 to about 98 wt. percent of the overall composition. In addition to its polymer components, the composition of the present invention may comprise fillers, and additives such as antioxidants, stabilizers, rubber processing oils lubricants (e.g., oleamide), antiblocking agents, waxes, foaming agents, flame retardants, pigments, coupling agents for the fillers and other processing aids known to the rubber compounding art. Metal oxides, e.g., MgO, can be included to act as acid acceptors. The pigments and fillers may comprise up to 30 wt. percent of the total composition based on polymer components plus additives. Preferably, the pigments and fillers comprise about 1 to about 30 wt. percent based on the composition, more preferably about 2 to about 20 weight percent of the overall composition.

Suitable fillers include talc, calcium carbonate, glass fibers, clays, silica, carbon black and mixtures thereof. Any type of carbon black can be used, such as channel blacks, furnace blacks, thermal blacks, acetylene black, lamp black and the like. Titanium dioxide, also considered a pigment, can be used to impart a white color to the final product.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the composition. This ratio can vary from about 0.3/1 to about 1.3/1; preferably about 0.5/1 to about 1.2/1; more preferably about 0.8/1 to about 1.1/1. Oils other than petroleum based oils such as oils derived from coal tar and pine tar can also be utilized. In addition to the petroleum derived rubber process oils, organic esters and other synthetic plasticizers can be used. As used herein, the term "process oil" means both the petroleum derived process oils and synthetic plasticizers.

The process oil may be included in the composition to insure that the composition has good flow properties. The quantity of oil utilized will depend in part on the amount of polymer blend and filler used as well as, to some extent, the type of cure system utilized. Generally, the process oil, when included, may comprise about 30 wt. percent of the composition. Larger amounts of process oil can be used, the deficit being reduced physical strength.

Antioxidants may be utilized in the composition of this invention to enhance further the improved aging properties of the elastomeric copolymers component of the present invention and to protect the engineering resins. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Nonlimiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldolalpha-naphthylamine; N,N'-di-phenyl-p-phenylene diamine, etc. The physical antioxidants include mixed petroleum waxes and microcrystalline waxes.

It is within the scope of this invention to incorporate an uncured rubber in combination with a dynamically vulcanized rubber in the composition. This can be accomplished by selecting as the uncured rubber a rubber which cannot be vulcanized by the vulcanizing agent used to cure the elastomeric halogenated copolymer component of the present invention which is to be dynamically vulcanized or by adding to the dynamically vulcanized thermoplastic composition, after the vulcanization agent has been fully consumed, a rubber which is vulcanizable by the vulcanization agent used to vulcanize the elastomeric halogenated copolymer component of the present invention. For example, when the elastomeric halogenated component of the present invention is vulcanized with a cure system which comprises zinc oxide, any other rubber which requires sulfur or another curative to vulcanize it or which is not vulcanizable can be included. Such rubbers include ethylene-propylene polymers (EPM), ethylene-propylene-diene polymers (EPDM), polyisobutylene, natural rubber, etc. Alternatively, the DVA can be prepared first from the resin and vulcanizable elastomer by dynamic vulcanization and subsequently, an uncured rubber can be blended into the DVA at a temperature above the melting point of the thermoplastic resin. In the embodiment in which an uncured rubber is incorporated in the dynamically vulcanized composition, the uncured rubber may be present in an amount ranging from above zero to about 25, preferably from about 5 to about 20 weight percent of the total rubber (i.e., elastomer) content of the composition.

When it is desired to produce a vulcanized composition, any conventional curative system which is capable of vulcanizing saturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when the thermoplastic engineering resins chosen as components are such that peroxide would cause these thermoplastic resins themselves to crosslink. Furthermore, any curative which would cause the particular engineering resin being used to crosslink under the processing conditions being used to prepare the dynamically vulcanized alloy should be excluded from the curative system used. Suitable curative systems for the elastomeric halogenated copolymer component of the present invention include zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur.

The vulcanization is conducted at conditions to vulcanize at least partially, preferably fully, the halogenated elastomeric copolymer.

In the practice of this invention, the engineering resin, the elastomeric copolymer and optional other polymers are mixed together at a temperature sufficient to soften the resin or, more commonly, at a temperature above its melting point when the resin is crystalline at room temperature. If the mixture is to be dynamically vulcanized, after the resin and other polymers have been intimately mixed, the curative or curatives are added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the matrix resin to about 300° C.; more typically, the temperature may range from about the melting point of the matrix resin to about 275° C. Preferably the vulcanization is carried out at a temperature range from about the flux temperature of the polymer blend to about 20° C. above the softening or melting temperature of the matrix resin.

It is preferred that the mixing process be continued until the desired level of vulcanization is completed. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the elastomer to be cured can be dynamically vulcanized in the presence of a portion or all of the engineering resin. This blend can then be let down into additional engineering resin. Similarly, it is not necessary to add all of the fillers and oil prior to dynamic vulcanization. A portion or all of the additives, fillers and oil can be added during or after the vulcanization is completed. Certain ingredients, such as stabilizers and process aids function more effectively if they are added after curing.

The term "rubber" is used herein interchangeably with "elastomer".

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the less extractables of the cured rubber components, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that of any rubber component, if optionally present, of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, with an appropriate solvent for the resin being used.

The cross-link density of the rubber is determined by equilibrium solvent swelling using the Flory-Rehner equation, as shown in J. Rubber Chem. and Tech. 30, p. 929. The appropriate Huggins solubility parameters for rubber solvent pairs used in the calculation were obtained from the review article by Sheehan and Bisio, J. Rubber Chem. & Tech. 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises nylon as the thermoplastic engineering resin, and a brominated copolymer of isobutylene and a para-methylstyrene.

PREFERRED EMBODIMENTS

The following examples are presented to illustrate the invention. All parts and percentages herein are by weight unless specifically stated otherwise.

EXAMPLE 1

Compositions in accordance with the invention and comparative compositions as described in Tables I to V were mixed in a 3-pound Banbury mixer utilizing a 10 to 15 minute cycle. The blend compositions were dynamically vulcanized during such cycle by prolonging the mix for about 5 minutes after the addition of a curing agent and dumping or discharging at an elevated temperature of about 375 to 450° F. (about 190° C. to about 232° C.).

The elastomer(s), the polyamide resin (nylon), stabilizer, mineral filler and process aids, were loaded and mixed at high speed until fluxed. The temperature was brought to about 30° F. above melting point of polyamide resin and the oil was added in increments. The curatives were then added and once the peaks in power and torque were observed, mixing was continued for 5 minutes to complete vulcanization and distribution of the cured elastomer. The rotor speed was suitably adjusted to maintain the batch at the desired temperature range. All portions of the remaining oil were then added and the composition dumped from the mixer.

Table II shows the comparisons between nylon resin DVAs prepared using ethylene propylene elastomer, maleic anhydride grafted ethylene propylene elastomer and brominated copolymer of isobutylene and para-methylstyrene, herein designated Copolymer T. The DVA prepared using Copolymer T, that is, composition C, which was a composition in accordance with the present invention had higher Vicat softening temperatures and superior resistance to compression set at elevated temperatures. Table IV shows the properties of additional nylon-DVA compositions. All the compositions have high Vicat softening temperatures.

Table V shows dynamically vulcanized compositions prepared by using a higher melting nylon resin. A bromobutyl elastomer DVA was used as the control. The DVAs containing the brominated copolymers of the present invention, i.e., Copolymer T or Copolymer Y had enhanced tensile strength, higher elongation, higher Vicat softening temperatures and improved compression set properties at elevated temperatures. They were also much more rubbery and snappy than the control and they did not develop voids which cause surface whitening when stretched.

Table VII shows the characteristics of the brominated—IB-PMS copolymers, that is, of the brominated copolymers of isobutylene and para-methylstyrene.

EXAMPLE 2

Table VI shows a comparative composition and DVA composition of the present invention comprising Copolymer Z, prepared using styrene acrylonitrile as the matrix resin in the DVA. The compositions were prepared in a similar manner as set forth in Example 1. The DVA containing Copolymer Z showed improved tensile strength, elongation, tear strength and Vicat softening temperatures compared to the corresponding control bromobutyl based DVA (Composition K).

Compositions in accordance with the invention and comparative compositions as described in Tables VIII to XII were mixed in a 0.8 inch Welding Engineers counter-rotating twin screw extruder fitted with a strand die at the extruder exit. The extruded strands were then cooled in a water bath before being reduced by a pelletizer into approximately ⅛" by ⅛" pellets. All the engineering resins were dried according to the manufacturers' recommended drying conditions. All pelletized compositions were dried at 150° F. under vacuum for at least four hours to remove surface moisture before being molded into various test specimens on a 15-ton Boy® injection molding machine. In the experiments to produce vulcanized blends, the unvulcanized blend was made first, and after proper drying to remove surface moisture, a mixture of the unvulcanized pellets and the curatives were re-extruded through the Welding Engineers extruder to produce finished pellets.

EXAMPLE 3

Table VIII shows vulcanized and unvulcanized blends of Copolymer A with a polyether/amide block copolymer (Pebax 5533 SA). Both compositions yielded extremely soft and tough materials as shown by their low flexural modulus and high elongations. The vulcanized version showed notched Izod impact improvement over the unvulcanized material.

EXAMPLE 4

Table IX shows 50/50 blends of Copolymer A with co-(polyether-ester) copolymer (Riteflex 555 HS), both unvulcanized and vulcanized. The physical properties of both materials were essentially the same except that a reduction of flexural modulus was observed for the vulcanized blend.

EXAMPLE 5

Table X shows a comparison of vulcanized and unvulcanized 70/30 blends of polybutylene terephthalate with Copolymer A. Improvement in elongation and reduction in stiffness were observed with the vulcanized composition, although both compositions had outstanding impact resistance at low temperature.

EXAMPLE 6

Table XI shows alloying of two engineering resins with brominated copolymers of isobutylene and para-methylstyrene. The two engineering resins selected were polybutylene terephthalate and co-(polyether-ester) copolymer using Copolymer A as the alloying agent. The vulcanized version was a softer and tougher composition relative to the unvulcanized composition, as shown by the reduction in flexural modulus and improvement in elongation.

EXAMPLE 7

Table XII shows three compositions comprising polyamide 6 and Copolymer B in an amount of 20, 30, and 40 percent, respectively. All three blends showed excellent mechanical and impact properties.

In these examples, Compositions C, D, E, F, H, I, J, L, M, N, O, P, Q, R, S, T, U, V, and W, are compositions in accordance with the present invention. The abbreviations and/or trademarks used in these tables are shown in Table XIII. The test methods used to measure the properties are shown in Table XIV.

TABLE I

| Composition | A | B | C |
|---|---|---|---|
| Ethylene Propylene Elastomer - VISTALON 3708 | 39.3 | — | — |
| Ethylene Propylene Elastomer - VISTALON 3708-0.2% Maleated | — | 39.3 | — |
| Copolymer T | — | — | 39.3 |
| Rilsan BMNO | 17.3 | 17.3 | 17.3 |
| Sunpar 150 Oil | 29.0 | 29.0 | 29.0 |
| Nucap 190 Clay | 10.0 | 10.0 | 10.0 |

TABLE I-continued

| Composition | A | B | C |
|---|---|---|---|
| Titanox 2071 | 1.0 | 1.0 | 1.0 |
| Sunolite 127 Wax | 1.4 | 1.4 | — |
| Stearic Acid (with Polymer) | 0.4 | 0.4 | 0.5 |
| Irganox 1010 | — | 0 | 0.2 |
| Irganox 1076 | 0.3 | 0.3 | — |
| Ultranox 626 | — | — | 0.2 |
| Chimassorb 944 | — | — | 0.2 |
| Tinuvin 770 | — | — | 0.2 |
| SP 1056 Resin | 0.5 | 0.5 | — |
| Protox 166, Zinc oxide | 0.8 | 0.8 | 1.0 |
| Stearic Acid (with cure) | — | — | 0.2 |
| Zinc diethyl dithiocarbamate | — | — | 0.5 |
| Zinc Stearate (end of cure) | — | — | 0.5 |

TABLE II

| Composition | A | B | C |
|---|---|---|---|
| Processability | | | |
| Bands on Rubber Mill | yes | yes | yes |
| Spiral Flow Test - cm at 800 psi | 11 | 12 | 10 |
| Physical Properties, Injected Molded | | | |
| Hardness, Shore A, Instantaneous | 65 | 65 | 58 |
| Tensile Strength, psi | 620 | 620 | 420 |
| Elongation, % | 90 | 60 | 84 |
| Set at Break, % | 9 | 3 | 3 |
| Tear-Die B, lb/inch | 130 | 120 | 62 |
| Compression Set B | | | |
| 22 hrs. @ 70 C, % | 74 | 71 | 37 |
| 22 hrs. @ 100 C, % | 92 | 92 | 40 |
| 22 hrs. @ 150 C, % | — | — | 49 |
| Vicat Softening Temp., C. (200 gm weight) | 80 | 80 | 176 |
| Description | Soft, rubbery, snappy, bands on rubber mill | | |

TABLE III

| Composition | D | E | F |
|---|---|---|---|
| Copolymer T | 39.30 | 37.30 | 35.37 |
| Rilsan BMNO | 19.30 | 21.40 | 22.37 |
| Sunpar 150 Oil | 32.0 | 27.46 | 28.71 |
| Sunpar 2280 Oil | — | — | 5.00 |
| Nucap 190 Clay | 5.00 | 9.50 | 4.50 |
| Titanox 2071 | 1.00 | 1.00 | 0.90 |
| Irganox 1010 | 0.20 | 0.20 | 0.18 |
| Ultranox 626 | 0.20 | 0.20 | 0.18 |
| Chimassorb 944 | 0.20 | 0.20 | 0.18 |
| Tinuvin 770 | 0.20 | 0.20 | 0.18 |
| Stearic Acid (with polymer) | 0.50 | 0.48 | 0.45 |
| Protox 166, Zinc Oxide | 1.00 | 0.95 | 0.90 |
| Zinc diethyl dithiocarbamate | 0.50 | 0.48 | 0.45 |
| Stearic Acid (with cure) | 0.20 | 0.20 | 0.18 |
| Zinc Stearate (end of cure) | 0.50 | 0.48 | 0.45 |

TABLE IV

| Composition | D | E | F |
|---|---|---|---|
| Processability | | | |
| Bands on Rubber Mill | yes | yes | yes |
| Spiral Flow Test | | | |

TABLE IV-continued

| Composition | D | E | F |
|---|---|---|---|
| - cm at 800 psi | 12 | 6 | 9 |
| Physical Properties Injection Molded | | | |
| Hardness - Shore A, 5 sec. | 65 | 62 | 70 |
| Tensile Strength, psi | 535 | 626 | 773 |
| Elongation, % | 84 | 58 | 97 |
| Tear - Die B, lb/in | 70 | — | — |
| Tear - Die C, lb/in | — | 130 | 108 |
| Compression Set | | | |
| 22 hrs @ 70 C, % | 42 | 66 | 65 |
| 22 hrs @ 100 C, % | 39 | — | — |
| 22 hrs @ 150 C, % | 56 | — | — |
| Vicat Softening Temp., C. (200 gm weight) | 174 | 181 | 180 |
| Description | Soft, rubbery, snappy bands on rubber mill | | |

TABLE V

| Composition | G | H | I | J |
|---|---|---|---|---|
| Bromobutyl 2244 | 45 | — | — | — |
| Copolymer T | — | 45 | — | 45 |
| Copolymer Y | — | — | 45 | — |
| Capron 8209F | 30 | 30 | 30 | 30 |
| Sunpar 150 Oil | 15 | 15 | 15 | — |
| Paraplex G 52[1] | — | — | — | 15 |
| Omyacarb UFT | — | 7 | 7 | 7 |
| Maglite D | 0.5 | — | — | — |
| Irganox 1010 | 0.2 | 0.2 | 0.2 | 0.2 |
| Chimassorb 944 | 0.2 | 0.2 | 0.2 | 0.2 |
| Tinuvin 770 | 0.2 | 0.2 | 0.2 | 0.2 |
| Curatives | | | | |
| Protox 169 Zinc Oxide | 5 | 1.1 | 1.1 | 1.1 |
| Stearic Acid | 0.5 | 0.2 | 0.2 | 0.2 |
| ZDEDC | 1 | 0.6 | 0.6 | 0.6 |
| End of Cure | | | | |
| Zinc Stearate | — | 0.5 | 0.5 | 0.5 |
| | Surface Whitens | Rubbery, Snappy Bands on Rubber Mill | | |
| Physical Properties | | | | |
| Hardness, Shore A[2] | 80/77 | 89/88 | 88/88 | 93/91 |
| Hardness, Shore D[2] | 13/8 | 25/21 | 21/19 | — |
| 100% Modulus, psi | — | 1389 | 1223 | 1300 |
| Tensile Strength, psi | 975 | 1505 | 1328 | 1811 |
| Elongation, % | 12 | 122 | 124 | 216 |
| Tear Die, C, lb/in | 222 | 236 | 226 | 303 |
| Tension Set, % @ 100% elong. | — | 21 | 24 | 29 |
| Thermal Properties Compression Set B, % | | | | |
| 22 hrs @ 100 C | 124 | 62 | 68 | 69 |
| 22 hrs. @ 150 C | 131 | 88 | 79 | 112 |
| Vicat (220 gm), C. | 163 | 218 | 217 | >230 |
| (1000 gm), C. | — | — | — | 174 |
| Flow | | | | |
| Spiral Flow, cm | 20 | 7 | 11 | not measured |

[1] epoxidized soybean oil (C. P. Hall)
[2] (Instantaneous/5 sec.)

TABLE VI

| Composition | K | L |
|---|---|---|
| Exxon Bromobutyl 2244 | 45 | — |
| Copolymer Z | — | 45 |
| Lustran SAN 31 | 30 | 30 |
| Sunpar 150 Oil | 15 | 15 |
| Omyacarb UFT | — | 7 |
| Maglite D | 0.5 | 0.2 |
| Irganox 1010 | 0.2 | 0.2 |
| Chimassorb 944 | 0.2 | 0.2 |
| Tinuvin 770 | 0.2 | 0.2 |
| Curatives | | |
| Protox 169, Zinc Oxide | 5 | 1.1 |
| Stearic Acid | 0.5 | 0.2 |
| Zinc Diethyldithiocarbamate | 1 | 0.6 |
| End of Cure | | |
| Zinc Stearate | — | 0.5 |
| Physical Properties | | |
| Hardness, Shore A (5 sec) | 74 | 94 |
| 100% Modulus, psi | 450 | 881 |
| Tensile Strength, psi | 500 | 883 |
| Elongation, % | 8 | 35 |
| Tear, Die C- -lb/in | 106 | 170 |
| Thermal Properties Compresion Set B, % | | |
| 22 hrs @ 150 C | 71 | 93 |
| Vicat (200 gm), C. | 103 | 130 |
| Flow | | |
| Spiral Flow, cm | 15 | 7 |

TABLE VII

Brominated Isobutylene-para-methylstyrene Copolymers Used

| Polymer # | Wt. %[a] Bromine | Mole %[b] Brominated PMS | Mv[c] |
|---|---|---|---|
| Copolymer T | 1.75 | 1.10 | 1,200,000 |
| Copolymer Y | 1.25 | 0.80 | 1,200,000 |
| Copolymer Z | 1.75 | 1.10 | 1,200,000 |
| Copolymer A | 1.65 | 1.0 | 280,000 |
| Copolymer B | 1.0 | 0.6 | 450,000 |

Notes
[a] Total bromine on polymer by x-ray fluorescence.
[b] Mole % brominated para-methyl-styrene (PMS) units By Nuclear Magnetic Resonance (NMR)
[c] Viscosity average Mw by dilute solution (DSV) in diisobutylene at 68 F.

TABLE VIII

| Composition | M | N |
|---|---|---|
| Pebax 5533 SA | 50 | 50 |
| Copolymer A | 50 | 50 |
| Irganox B-215 | 0.2 | 0.2 |
| Curatives | | |
| Zinc Oxide (Protox 169) | — | 0.35 |
| Zinc Diethyldithiocarbamate | — | 0.35 |
| Stearic Acid | — | 0.6 |
| Physical Properties | | |
| Tensile at Break, psi | 1500 | 1200 |
| Elongation at Break, % | 450 | 440 |
| Flexural Modulus[1], kpsi | 7.1 | 4.1 |
| Notched Izod-¼", ft-lb/in. | | |

TABLE VIII-continued

| Composition | M | N |
|---|---|---|
| −30° C. | 1 | 6 |
| −40° C. | 0.3 | 6 |

(1)Measured flexural modulus for 100% Pebax 5533 SA is 29 kpsi

TABLE IX

| Composition | O | P |
|---|---|---|
| Riteflex 555 HS | 50 | 50 |
| Copolymer A | 50 | 50 |
| Irganox B-215 | 0.2 | 0.2 |
| Curatives | | |
| Zinc Oxide (Protox 169) | — | 0.35 |
| Zinc Diethyldithiocarbamate | — | 0.35 |
| Stearic Acid | — | 0.6 |
| Physical Properties | | |
| Tensile at Break, psi | 1000 | 1020 |
| Elongation at Break, % | 460 | 380 |
| Flexural Modulus, kpsi(1) | 5.9 | 4.2 |
| Notched Izod-¼", ft-lb/in. | | |
| 23° C. | 2.8 | 3.2 |
| −30° C. | 1.6 | 1.1 |

(1)Measured flexural modulus for 100% Riteflex 555 HS is 25 kpsi; notched Izod at room temperature (23° C.) is 7.0 ft-lb/in.

TABLE X

| Composition | Q | R |
|---|---|---|
| Celanex 2002 | 70 | 70 |
| Copolymer A | 30 | 30 |
| Irganox B-215 | 0.2 | 0.2 |
| Curatives | | |
| Zinc Oxide (Protox 169) | — | 0.2 |
| Zinc Diethyldithiocarbamate | — | 0.2 |
| Stearic Acid | — | 0.4 |
| Physical Properties(1) | | |
| Tensile at Break, psi | 3600 | 3000 |
| Elongation at Break, % | 38 | 136 |
| Flexural Modulus, kpsi | 161 | 125 |
| Notched Izod-¼", ft-lb/in. | | |
| −30° C. | 13 | 9.4 |
| −40° C. | 9.5 | 3.1 |

(1)Measured properties of 100% Celanex 2002 are:
Elongation at peak - 150%
Flexural modulus - 370 kpsi
Notched Izod-¼"at room temperature - 0.9 ft-lb/in.

TABLE XI

| Composition | S | T |
|---|---|---|
| Celanex 2002 | 60 | 60 |
| Riteflex 555 HS | 20 | 20 |
| Copolymer A | 20 | 20 |
| Irganox B-215 | 0.2 | 0.2 |
| Curatives | | |
| Zinc Oxide (Protox 169) | — | 0.1 |
| Zinc Diethyldithiocarbamate | — | 0.1 |
| Stearic Acid | — | 0.2 |
| Physical Properties(1) | | |
| Tensile at Break, psi | 3200 | 3200 |
| Elongation at Break, % | 18 | 110 |
| Flexural Modulus, kpsi | 114 | 88 |
| Notched Izod-¼", ft-lb/in. | 6 | 6 |
| −30° C. | | |

(1)See Footnotes Tables IX and X for key physical properties of Celanex 2002 and Riteflex 555 HS

TABLE XII

| Composition | U | V | W |
|---|---|---|---|
| Capron 8209F | 80 | 70 | 60 |
| Copolymer B | 20 | 30 | 40 |
| Irganox B-215 | 0.1 | 0.1 | 0.1 |
| Physical Properties(1) | | | |
| Tensile at Break, psi | 8400 | 6800 | 5200 |
| Elongation at Break, % | 116 | 224 | 134 |
| Flexural Modulus, kpsi | 268 | 208 | 175 |
| Notched Izod-¼", ft-lb/in.(2) | | | |
| 23° C. | 21 | 22 | 21 |
| 0° C. | 17 | 21 | 21 |
| −10° C. | 3.4 | 20 | 21 |
| −20° C. | 2.6 | 4.8 | 17 |
| −30° C. | 1.7 | 2.6 | 3 |
| −40° C. | 1.6 | 1.6 | 1.8 |

(1)Dry As Molded Properties
(2)Measured room temperature (23° C.) notched Izod impact strength for 100% Capron 8209F is 1.0 ft-lb/in.

TABLE XIII

| Ingredient | Description |
|---|---|
| Ethyl Zimate<br>R. T. Vanderbilt | Zinc Diethyldithiocarbamate (ZDEDC) |
| Maglite D<br>C. P. Hall Co. | Magnesium Oxide |
| Vistalon 3708<br>Exxon Chemical Co. | Ethylene-Propylene-Diene Terpolymer Mooney Viscosity According to ASTM D1646, ML 1 + 4 at 125° C. = 54 ± 5 |
| Sunpar 150 Oil<br>R. E. Carroll | Paraffinic Oil, ASTM D2226 Type 104B |
| Sunpar 2280 Oil<br>R. E. Carroll | Paraffinic Oil ASTM D 2226 Type 104B |
| Sunolite 127 Wax<br>Witco Chemical | Blend of Petroleum Waxes |
| Irganox 1010<br>Ciba Geigy | Tetrakis (methylene (3,5-di-tert-butyl-4-hydroxyhydro-cinnamate)methane |
| Irganox 1075<br>Ciba Geigy | Thiodiethylene bis-3,5-di tert-butyl-4-hydroxyhydro-cinnamate) |
| Irganox B-215<br>Ciba-Geigy | 33/67 Blend of Irganox 1010 and Irgafos 168 |
| Irgafos 168<br>Ciba-Geigy | Tris (2,4-di-tert-butyl-phenyl) phosphite |
| Ultranox 626<br>Borg-Warner | bis(2,4-di-t-butyl-phenyl) pentaerythritol diphosphite |
| Chimassorb 944<br>Ciba-Geigy | N,N'-bis (2,2,6,6-tetra-methyl-4-piperidinyl-1,6-hexanediame polymer with 2,4,6-trimethyl-1,2-pentane-amine |
| Tinuvin 770<br>Ciba-Geigy | Bis)2,2,7,6-tetramethyl-4-piperidylsebacate |
| Sp 1056 Resin<br>Schenectady Chemical | Bromomethylated alkylphenol formaldehyde resin |
| Protox 166<br>New Jersey Zinc Co. | Zinc Oxide |
| Protox 169<br>New Jersey Zinc. Co. | Zinc Oxide |

TABLE XIII-continued

| Ingredient | Description |
| --- | --- |
| Titanox 2071 DuPont | Titanium Dioxide |
| Lustran SAN 31 Monsanto Co. | Styrene-Acrylonitrile Resin |
| Omyacarb UFT Omya | Calcium Carbonate, Surface Coated |
| Capron 8209F Allied Signal | Polyamide 6 |
| Rilsan BMNO Atochem Inc. | Polyamide 11 |
| Pebax 5533 SA Atochem, Inc. | Polyether/amide Block Copolymer |
| Riteflex 555 HS Hoechst-Celanese | Co-(polyether-ester) Copolymer |
| Celanex 2002 Hoechst-Celanese | Polybutylene Terephthalate |

TABLE XIV

| Test | Test Method |
| --- | --- |
| Shore A Hardness, 5 sec. | ASTM D2240 |
| Tensile Strength, psi | ASTM D412 |
| Set at break, % | ASTM D412 |
| Tear - Die B, lb/inch | ASTM D624 |
| Tear - Die C, lb/inch | ASTM D624 |
| Compression Set Method B | ASTM D395 |
| Vicat Softening Temp., ° C. | ASTM D1525 |
| Spiral flow,[1] cm at 800 psi | See Footnote |
| Flexural Modulus, psi | ASTM D790 |
| Notched Izod Impact Ft-lb/inch | ASTM D256 |
| Tensile Strength[2], psi | ASTM D638 |
| Elongation[2], % | ASTM D638 |

[1]The spiral flow method is performed by injecting the composition to be tested at a nozzle temperature of 220° C. and a pressure of 800 psi into a spiral mold containing a pathway of semi-circular cross section having a diameter of 0.3 cm, and measuring the length of the portion of the pathway filled by the composition.
[2]For Examples 3 through 7.

What is claimed is:

1. A thermoplastic composition comprising a polymer blend of a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrenemaleic anhydride, polyimides, aromatic polyketones, and mixtures thereof, and an elastomeric halogen-containing copolymer of a $C_4$ to $C_7$ isomonoolefin and a para-alkylstyrene, which copolymer contains from about 0.5 to about 25 weight percent of said para-alkylstyrene.

2. The thermoplastic composition of claim 1, wherein said composition is a non-vulcanized composition.

3. The thermoplastic composition of claim 1, wherein said composition is a vulcanized composition.

4. The thermoplastic composition of claim 3, wherein said vulcanized composition is a dynamically vulcanized composition.

5. The thermoplastic composition of claim 3, wherein said elastomeric halogen-containing copolymer is at least partially vulcanized.

6. The thermoplastic composition of claim 3, wherein said elastomeric halogen-containing copolymer is fully vulcanized.

7. The thermoplastic composition of claim 1, wherein said engineering resin is present in an amount ranging from about 10 to 98 weight percent, and said elastomeric halogen-containing copolymer is present in an amount ranging from about 2 to 90 weight percent, based on said polymer blend.

8. The thermoplastic composition of claim 1, wherein said engineering resin is present in an amount ranging from about 20 to 95 weight percent, and said elastomeric halogen-containing copolymer is present in an amount ranging from about 5 to 80 weight percent, based on said polymer blend.

9. The thermoplastic composition of claim 1, wherein said elastomeric halogen-containing copolymer is present in said composition as particles dispersed in said engineering resin.

10. The thermoplastic composition of claim 1, wherein said engineering resin comprises a polyamide.

11. The thermoplastic composition of claim 10, wherein said polyamide is selected from the group consisting of nylon 6, nylon 6,6; nylon 11 and mixtures thereof.

12. The thermoplastic composition of claim 1, wherein said elastomeric halogen-containing copolymer comprises from above zero to about 10 weight percent of said halogen.

13. The thermoplastic composition of claim 1, wherein said halogen is selected from the group consisting of chlorine, bromine, and mixtures thereof.

14. The thermoplastic composition of claim 1, wherein said halogen comprises bromine, and wherein said bromine is chemically bound to said para-alkylstyrene.

15. The thermoplastic composition of claim 1, wherein said isomonoolefin is isobutylene and said para-alkylstyrene is para-methylstyrene.

16. The thermoplastic composition of claim 1, additionally comprising a component selected from the group consisting of a filler, a rubber compounding additive, and mixtures thereof.

17. The thermoplastic composition of claim 1, additionally comprising a component selected from the group consisting of rubber processing oils, plasticizers, and mixtures thereof.

18. The thermoplastic composition of claim 1, said composition has a secant flexural modulus ranging from about 100 to about 400,000 $kg/cm^2$ measured according to ASTMD 790 at 1% strain.

19. A process for preparing a vulcanized thermoplastic composition, which comprises the steps of:

(a) blending a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene-maleic anhydride, polyimides, aromatic polyketones, and mixtures thereof, an unvulcanized elastomeric halogen-containing copolymer of a $C_4$ to $C_7$ isomonoolefin and a para-alkylstyrene, which copolymer contains from about 0.5 to about 25 weight percent of said para-alkylstyrene, and a vulcanization agent for said elastomeric halogen-containing copolymer; and (b) masticating and shearing the blend resulting from step (a) at vulcanization conditions for a time sufficient to produce a vulcanized thermoplastic composition.

20. The process of claim 19, wherein said vulcanized thermoplastic composition comprises crosslinked discrete particles of said elastomeric halogen-containing copolymer dispersed in said thermoplastic engineering resin.

21. The process of claim 19, wherein said vulcanization conditions include a temperature ranging from about the melting point of said engineering resin to about 300° C.

22. The process of claim 19, wherein said engineering resin comprises a polyamide.

23. The process of claim 22, wherein said polyamide is selected from the group consisting of nylon 6, nylon 6,6; nylon 11, and mixtures thereof.

24. The process of claim 19, wherein said elastomeric halogen-containing copolymer comprises from above zero to about 10 weight percent of said halogen.

25. The process of claim 19, wherein said halogen is selected from the group consisting of chlorine, bromine, and mixtures thereof.

26. The process of claim 19 wherein said halogen comprises bromine and wherein said bromine is chemically bound to said para-alkylstyrene.

27. The process of claim 19, wherein said isomonoolefin is isobutylene and said para-alkylstyrene is para-methylstyrene.

28. The process of claim 19, wherein said vulcanized thermoplastic composition comprises from about 10 to about 98 weight percent of said engineering resin, and from about 2 to about 90 weight percent of said elastomeric halogen-containing copolymer, based on said engineering resin plus said elastomeric halogen-containing copolymer.

\* \* \* \* \*